(12) United States Patent
Yoshida

(10) Patent No.: US 8,274,681 B2
(45) Date of Patent: Sep. 25, 2012

(54) PRINTING SYSTEM, PRINTER, ADMINISTRATING DEVICE FOR THE NUMBER OF SHEETS, AND PROGRAM

(75) Inventor: Tomoya Yoshida, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 945 days.

(21) Appl. No.: 12/236,981

(22) Filed: Sep. 24, 2008

(65) Prior Publication Data

US 2009/0086264 A1  Apr. 2, 2009

(30) Foreign Application Priority Data

Oct. 1, 2007  (JP) ................................ 2007-257996

(51) Int. Cl.
- *G06F 3/12* (2006.01)
- *G06F 17/00* (2006.01)
- *G06K 15/02* (2006.01)
- *H04N 1/40* (2006.01)
- *G03G 21/02* (2006.01)
- *H04M 15/00* (2006.01)

(52) U.S. Cl. ....... 358/1.15; 358/1.13; 358/443; 358/1.2; 399/79; 715/234; 379/112.07

(58) Field of Classification Search .................. None
See application file for complete search history.

(56) References Cited

U.S. PATENT DOCUMENTS

| | | | | |
|---|---|---|---|---|
| 6,088,550 A | * | 7/2000 | Asai et al. ........................ | 399/79 |
| 2007/0229874 A1 | * | 10/2007 | Hamada ....................... | 358/1.14 |
| 2008/0186530 A1 | * | 8/2008 | Kurozasa ..................... | 358/1.15 |

FOREIGN PATENT DOCUMENTS

| | | |
|---|---|---|
| JP | 2001-320690 | 11/2001 |
| JP | 2003-205666 | 7/2003 |
| JP | 2003-274065 | 9/2003 |
| JP | 2003-330686 | 11/2003 |

OTHER PUBLICATIONS

Japanese Office Action dated Sep. 1, 2009.

* cited by examiner

*Primary Examiner* — Thomas Lett
(74) *Attorney, Agent, or Firm* — Finnegan, Henderson, Farabow, Garrett & Dunner, L.L.P.

(57) ABSTRACT

A printing system, provided with a first administrating section for administrating the number of sheets remaining until the number of printed sheets reaches to a predetermined upper limit of the number of sheets, a second administrating subsection for administrating the number of reserved sheets being under a waiting condition for being printed and outputted in the printing section, and a judging section for comparing the total number of sheets of the number of reserved sheets and the number of scheduled sheets indicated in a printing permission request with the number of remaining sheets when receiving the printing permission request. The judging section judges from the comparison whether or not the printing requested by the printing permission request is to be permitted, and transmits the judgment result as the response to the printing permission request.

13 Claims, 4 Drawing Sheets

PRINTING SYSTEM, PRINTER, ADMINISTRATING DEVICE FOR THE NUMBER OF SHEETS, AND PROGRAM

This application is based on Japanese Patent Application No. 2007-257996 filed on Oct. 1, 2007, in Japanese Patent Office, the entire content of which is hereby incorporated by reference.

BACKGROUND OF THE INVENTION

The present invention relates to a printing system equipped with a function to administrate the use of printing and copying, a printer, an administrating device for the number of printed sheets, and a program.

In a printing system in which a printer, a copying machine, and so on are connected with a server via a network, there is a system constituted such that the server administrates accounts of prints and copies and restriction of use for each ID (identification).

With regard to the administration of the use of a printer and a copier, according the technique disclosed in Japanese Patent Unexamined Publication No. 11-205498 as one example, a sever counts the number of actually printed and outputted sheets in a printing job and a copying job for each ID and then administrates unitary for those jobs. Further, according to the technique disclosed in Japanese Patent Unexamined Publication No. 2003-150355 as one example, when a sever receives a printing job or a copying job, the server predicts the number of printed sheets before executing printing, compares it with the number of remaining sheets (the number of printable remaining sheets) corresponding to the user ID having requested the job, and limits the printing if the number of remaining sheets is smaller than the predicted one. Further, with this technique, the server is adapted to renew the number of remaining sheets of the user by the number of sheets actually printed and outputted by a printer.

In each of the above mentioned techniques, the administration of the number of sheets is conducted on the basis of the number of sheets (count of jobs, or log information) which were actually printed and outputted, the number of sheets (the number of reserved sheets) to be used for a job (standby job) waiting for being executed is not taken into consideration. Therefore, there is a possibility that the limitation of the number of sheets cannot be conducted correctly for a job processed at the time that the number of sheets becomes small.

For example, in the case where plural jobs by the same ID are waiting, in particular, in the case where a job to print a large number of sheets is waiting, a next job is permitted before the actual number of sheet of the standby job is reflected to the administration, the possibility that the number of remaining sheets (the upper limit of the number of sheets) is exceed by the printing of the job becomes high.

Therefore, it is required to provide a printing system, a printing apparatus, an administrating device of the number of printed sheets, and a program with which it is possible to make the possibility to permit printing in excess of the limitation of the number of sheets low by the administration of the number of sheets including the number of reserved sheets on the waiting condition for being executed and outputted.

SUMMARY OF THE INVENTION

Aspects of the present invention are the following structures.

A printing system, comprises:
a printing requesting section;
a printing section; and
an administrating section, wherein the printing requesting section, the printing section and the administrating section are connected with each other so as to be able to communicate,
wherein the print requesting section transmits a printing permission request including information of the number of sheets being scheduled to be printed to the administrating section, and in the case that a response from the administrating section indicates a printing permission, the print requesting section transmits a printing request for the scheduled printing to the printing section, and
wherein the administrating section comprises:
a first administrating section for administrating the number of remaining sheets until the number of sheets printed by the printing section reaches to a predetermined upper limit of the number of sheets,
a second administrating subsection for administrating the number of reserved sheets being under a waiting condition for being printed and outputted in the printing section, and
a judging section for comparing the total number of sheets of the number of reserved sheets administrated by the second administrating section and the number of scheduled sheets indicated by the information of the number of sheets included in the printing permission request with the number of remaining sheets administrated by the first administrating section when receiving the printing permission request, for judging from the comparison whether or not the printing requested by the printing permission request is to be permitted, and for transmitting the judgment result as the response to the printing permission request.

A printing apparatus, comprises:
a printing section to print based on a printing request received from a printing requesting apparatus, wherein the printing requesting apparatus transmits a printing permission request including information of the number of sheets being scheduled to be printed to the printing apparatus and transmits a printing request for the scheduled printing to the printing section in the case of receiving a printing permission by a response from the printing apparatus,
a first administrating section for administrating the number of remaining sheets until the number of sheets printed by the printing section reaches to a predetermined upper limit of the number of sheets,
a second administrating subsection for administrating the number of reserved sheets being under a waiting condition for being printed and outputted in the printing section, and
a judging section for comparing the total number of sheets of the number of reserved sheets administrated by the second administrating section and the number of scheduled sheets indicated by the information of the number of sheets included in the printing permission request with the number of remaining sheets administrated by the first administrating section when receiving the printing permission request, for judging from the comparison whether or not the printing requested by the printing permission request is to be permitted, and for transmitting the judgment result as the response to the printing permission request.

An administrating apparatus for the number of sheets to be printed, wherein the administrating apparatus is connected to be able to communicate with a printing requesting apparatus to transmit a printing permission request including information of the number of sheets being scheduled to be printed to the administrating apparatus and transmits a printing request for the scheduled printing to a printing apparatus in the case of receiving a printing permission by a response from the administrating apparatus and a printing apparatus to print based on the printing request received from the printing requesting apparatus, the administrating apparatus comprises;

a first administrating section for administrating the number of remaining sheets until the number of sheets printed by the printing section reaches to a predetermined upper limit of the number of sheets, a second administrating section for administrating the number of reserved sheets being under a waiting condition for being printed and outputted in the printing section, and a judging section for comparing the total number of sheets of the number of reserved sheets administrated by the second administrating section and the number of scheduled sheets indicated by the information of the number of sheets included in the printing permission request with the number of remaining sheets administrated by the first administrating section when receiving the printing permission request, for judging from the comparison whether or not the printing requested by the printing permission request is to be permitted, and for transmitting the judgment result as the response to the printing permission request.

A media memorizing a program to make a computer to realize an administrating function for the number of sheets to be printed, the administrating function comprises:

a first function to administrate the number of remaining sheets until the number of sheets printed by a printing section reaches to a predetermined upper limit of the number of sheets and the number of reserved sheets being under a waiting condition for being printed and outputted in the printing section, to compare the total number of sheets of the number of reserved sheets and the number of scheduled sheets with the number of remaining sheets when receiving a printing permission request including information of the number of sheets scheduled to be printed, to judge from the comparison whether or not the printing requested by the printing permission request is to be permitted, and to transmit the judgment result as a response to the printing permission request;

a second function to transmit a printing reservation registering request including information of the number of printing-scheduled sheets of a printing permission to the first function when receiving a response of the printing permission from the first function and to make the first function to renew the number of reserved sheets being under a waiting condition for being printed and outputted; and a third function to transmit a printing request of the printing of the printing permission to the printing section.

DETAILED DESCRIPTION OF THE PREFERRED EMBODIMENT

Hereafter, an embodiment of the present invention will be described based on drawings.

Figure 1:
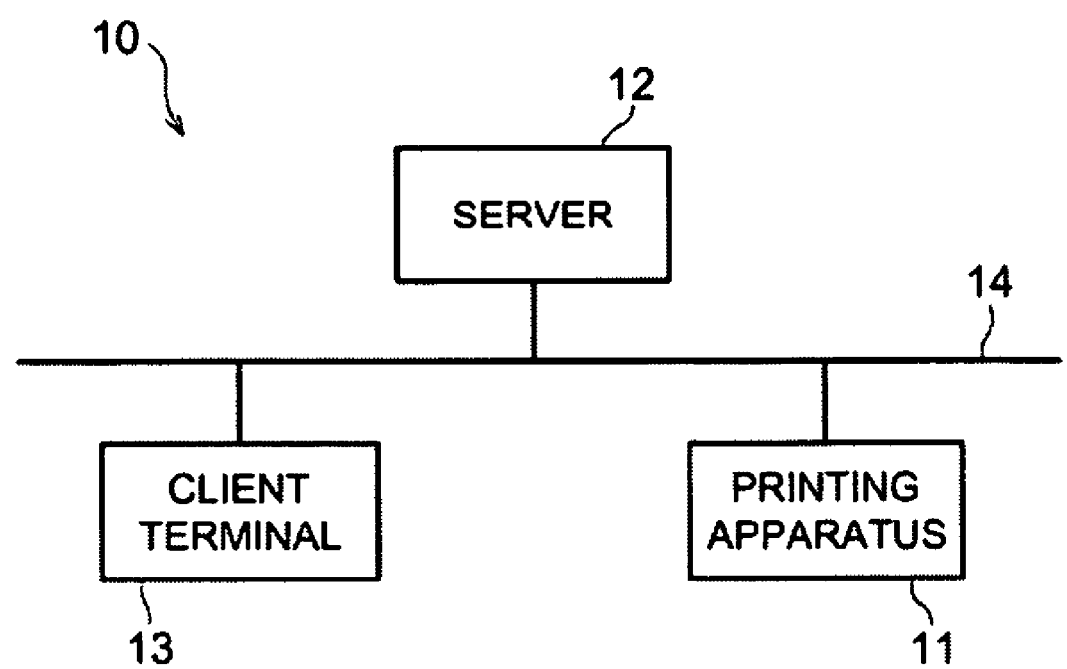
FIG. 1 is a schematic view showing an entire structure of a printing system according to an embodiment of the present invention.

FIG. 1 shows the entire configuration of a printing system 10 according to the embodiment of the present invention. The printing system 10 is equipped with a printing apparatus 11 which is a printing section, a server 12 which is a administrating section, and a client terminal 13 which is a printing requesting section, which are mutually connected so as to make it possible to communicate with each other through a network 14.

In the printing system 10 according to the present embodiment, with regard to the printed outputs of a print or a copy from the printing apparatus 11, the server 12 achieves a function (as an administrating server for the number of sheets) to count the number of sheets independently for each user (private users and divisions of a company) and to administrate the number of remaining sheets, accounting information and the like and a function (as an administrating server for job queue information) to administrate job queue for each user, and this server 12 and the printing apparatus 11 are adapted to cooperate and conduct an administration for the number of sheets in printing or copying for each user. Here, with regard to the number of print sheets in printing or copying, the upper limit of the number of sheets during the predetermined period is determined for each user (private users and divisions of a company), for example, such as 1000 sheets per month. Here, "the number of remaining sheets" is the number of sheets obtained by a step of subtracting the number of sheets having been already printed and outputted ("the number of printed and outputted sheets") from "the upper limit of the number of sheets".

(the number of remaining sheets)=(the upper limit of the number of sheets)−(the number of sheets having been printed and outputted)

Figure 2:
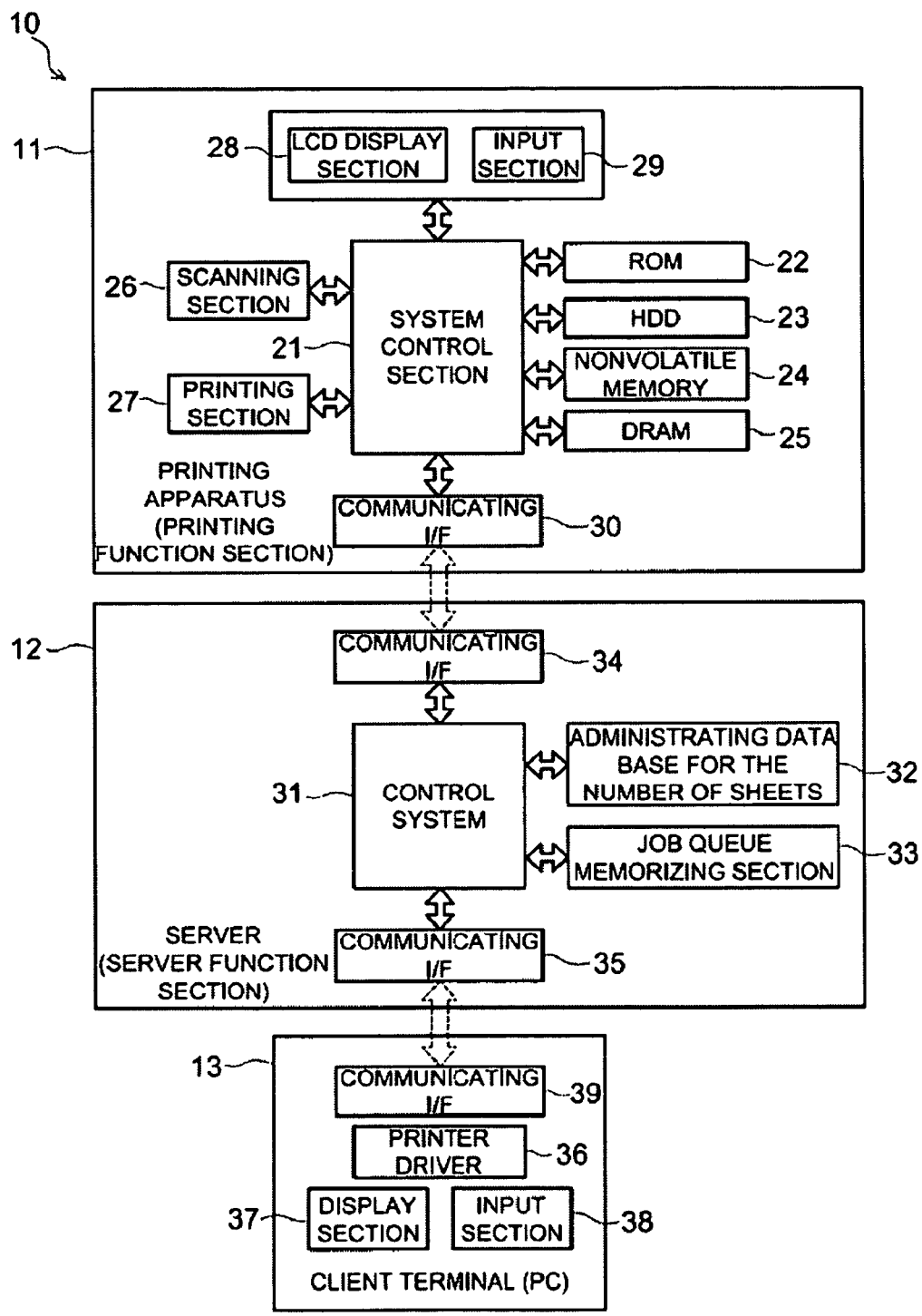
FIG. 2 is a block diagram showing a structure of the printing system according to the embodiment of the present invention.

FIG. 2 shows a block diagram showing the structure of the control system of the printing system 10.

The printing apparatus 11 is constituted as a multi-function peripheral with a copy function to read a document sheet and to print the corresponding image on a sheet, a scanner function, a printer function, a facsimile function, and the like, and is equipped with a system control section 21, ROM (Read Only Memory) 22, a HDD (Hard Disk Drive) 23, a nonvolatile memory 24, a DRAM(Dynamic Random Access Memory) 25, a scanner section 26, a printer section 27, a LCD (Liquid Crystal Display) display section 28, an input section 29, and a communicating I/F (Interface) 30.

The system control section 21 is provided with an arithmetic processing function, an operation control function to control the operations of the printing apparatus 11, a mode judging function to judge functional modes (copy/scan/print/FAX modes) of the printing apparatus 11, a display control function to control a display of the LCD display section 28, an image processing function to perform various kinds of image processing including OCR processing (Optical Character Reader), a function to create information of the number of sheets at the time of copy operation (data of the number of sheets used in copying) and the like.

ROM22 achieves a function to store various kinds of control programs to be executed by the system control section 21. HDD23 achieves a function to store fixed-format data and various kinds of preservation data. The nonvolatile memory 24 achieves a function to store a serial number, various kinds of software parameters, count data of an apparatus, count data of components, etc. DRAM25 achieves a function as an image memory to store temporarily image data read in a scanning action.

The scanner section 26 achieves a function to read document sheets and fixed-format sheets. The printer section 27 achieves a function to print an image based on image data on a sheet and to output the sheet.

The LCD display section 28 and the input unit 29 constitute a display console panel and input keys. The LCD display section 28 achieves a function to perform various kinds of displays with regard to functional modes of the printing apparatus 11, operations, alarms, errors, etc., and the input unit 29 achieves a function to receive input operations by a user.

The Communicating I/F30 achieves a function to control communication and data transfer conducted among the server 12 and the client terminal 13 connected through the network 14.

The server 12 has a function as an administrating server to administrate the number of sheets and information regarding the use in copying, scanning and printing for each user ID (according to private users and departments in a company) to identify a user, and a function as a job queue information administrating server to administrate job queue of a copy and a print for each user ID, and is equipped with a control system 31, an administrating database (Data Base) 32 for administrating the number of sheets, a job queue storage section 33, and communicating I/Fs 34 and 35.

The control system 31 achieves a function to produce lists and reports with regard to a using status of copying, scanning, and printing (count, accounting information, etc.), a function to conduct administrating the number of sheets by controlling the administrating database 32 for administrating the number of sheets, a function to conduct administrating job queue (registering/deleting job) by controlling a job queue storage section 33, and a function to control communication conducted among external devices connected to the network 14.

The administrating database 32 for administrating the number of sheets achieves a function to convert information (the upper limit of the number of sheets, count (the number of printed and outputted sheets) the number of remaining sheets, accounting information) with regard to a use of copying, scanning, and printing (count, accounting information, etc.) into data base for each user ID and to store the data base. Accordingly, the control system 31 and the administrating data base 32 achieve the function of the first administrating section (the administrating section of the number of remaining sheets) to administrate the number of remaining sheets until the number of sheets printed by the printing section reaches to a predetermined upper limit of the number of sheets.

The job queue memorizing section 33 achieves a function to memorize job information (including information of the number of sheets) to be performed. Accordingly, the control system 31 and the job queue memorizing section 33 achieve the function of the second administrating section (the administrating section of the number of reserved sheets) to administrate the number of reserved sheets being under a waiting condition for being printed and outputted. In the job queue memorizing section 33, a plurality of job queues corresponding to a plurality of user IDs have been prepared, and all of job information of the same user ID are registered in the same job queue corresponding to the user so that job queue is administrated for each user ID.

The communicating I/Fs 34, 35 achieves a function to control communication and data transfer performed among the printing apparatus 11 and the client terminal 13 which are connected through the network 14 to each other.

The client terminal 13 is structured with general-purpose PC (Personal Computer) and has a function to produce documents and images by application programs working on OS (Operating system) and a function to transmit printing job and printing data through the network 14 at the time of printing a document and an image. This client terminal 13 is equipped with a printer driver 36, a display section 37, an input section 38, and a communicating I/F 39.

The printer driver 36 achieves a function to create print data and information of the number of printing-scheduled sheets (data of the number of using sheets) in response to printing instruction, a function to control transmission of permission request of printing job (printing permission request) and job information (printing reservation registering request) to the server 12, and a function to control transmission of print data to the printing apparatus 11.

The display section 37 is constituted by LCD and so on and achieves a function to indicate various kinds of images, pictures and a display screen to conduct operating and setting OS, application programs. The input section 38 is constituted by a keyboard, a mouse, and so on and achieves a function to receive operations and inputs by a user. The communicating I/F 39 achieves a function to control communication and data transfer performed among the printing apparatus 11 and the server 12 which are connected through the network 14 to each other.

Next, operations of the printing system 10 will be explained.

Figure 3:
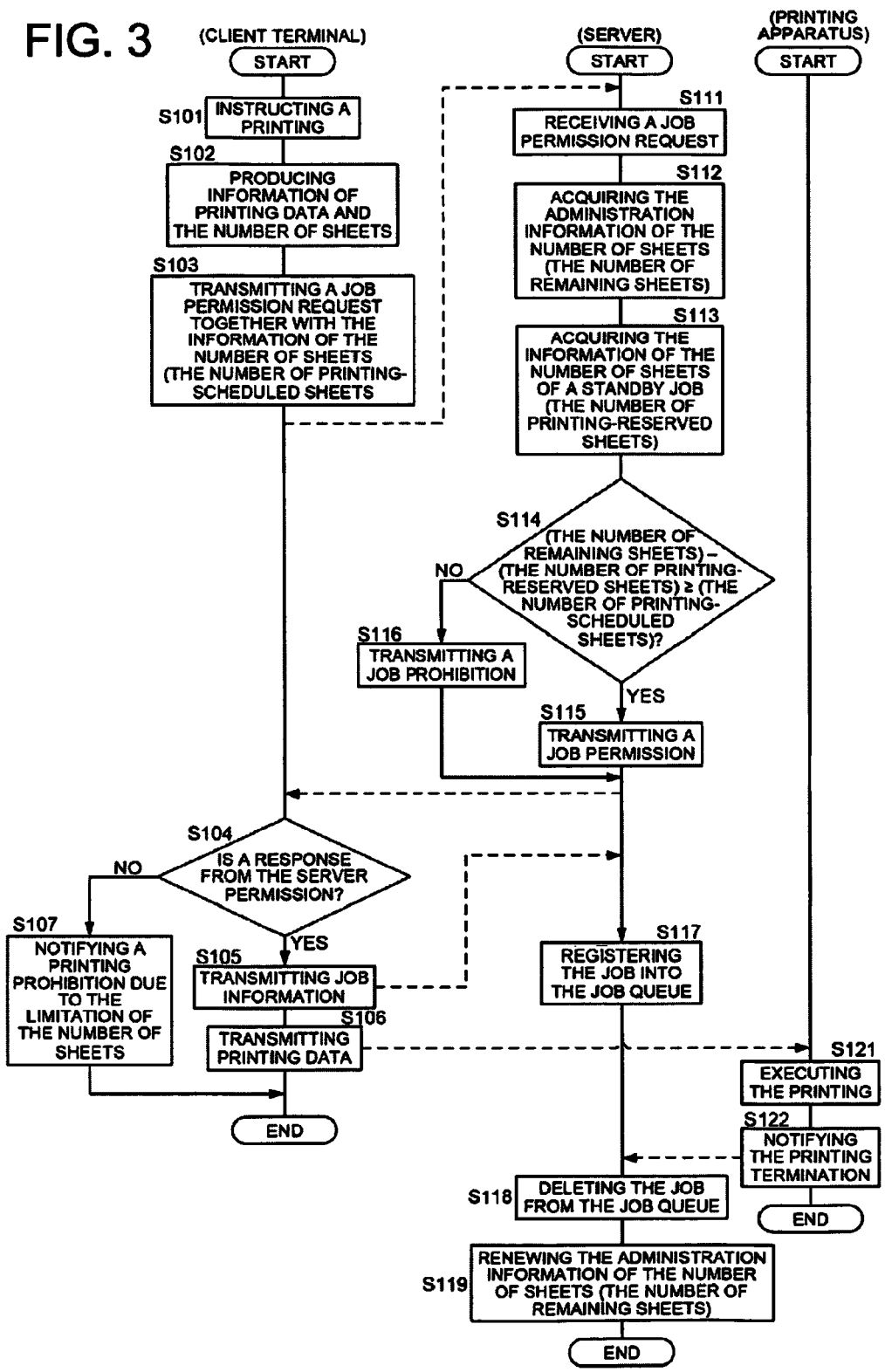
FIG. 3 is a flowchart showing flows of processing of printing operations by the printing system according to the embodiment of the present invention.
Figure 4:
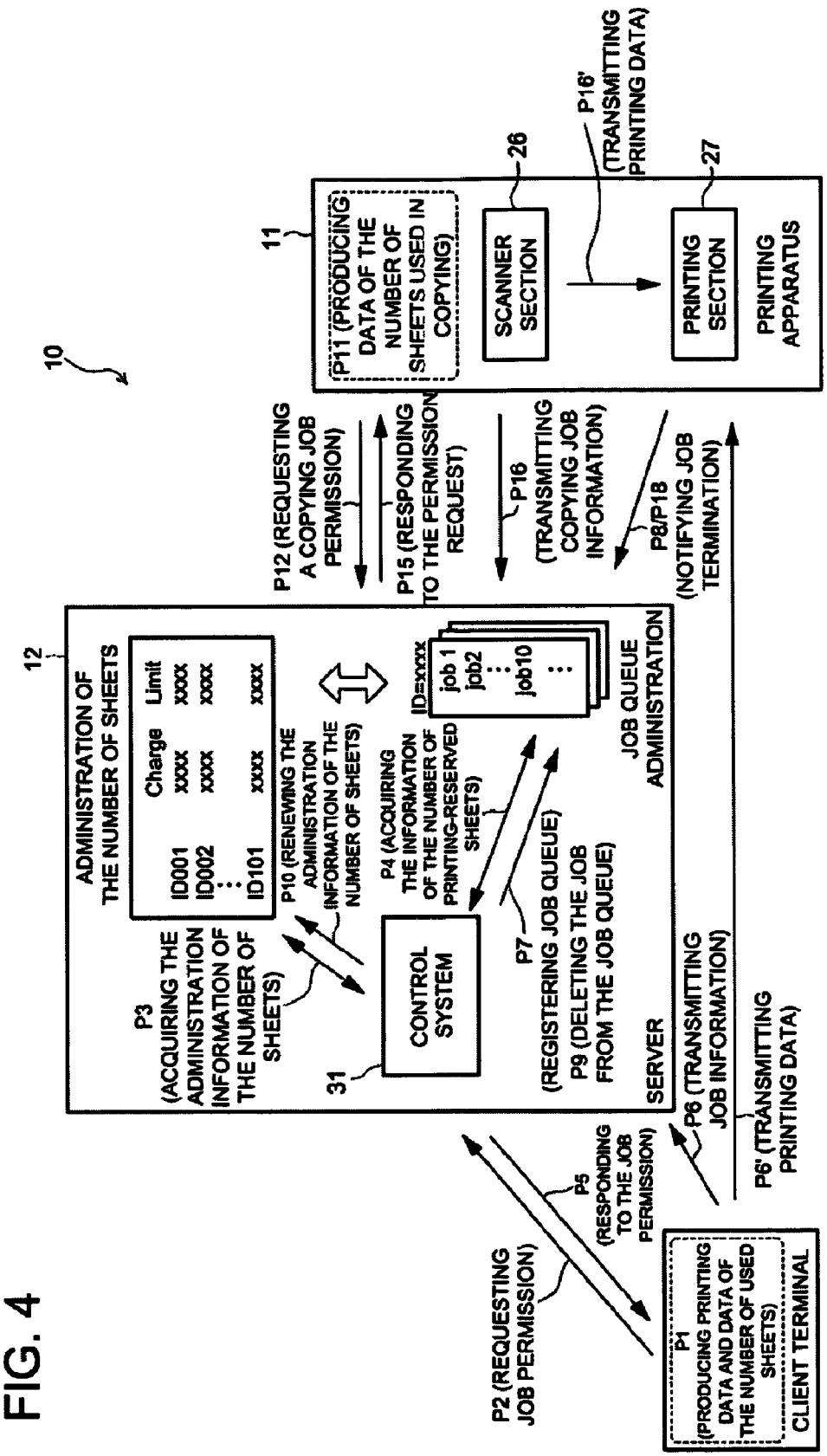
FIG. 4 is a data flow diagram showing flows of data in the printing operations by the printing system according to the embodiment of the present invention.

FIG. 3 shows a flow of processing of printing operations by the printing system 10. Concretely, it shows a flow of processing of each operation of instructing a printing by the client terminal 13, administrating the number of sheets and job queue by the server 12 and executing the printing by the printing apparatus 11. FIG. 4 shows a flow of data among the client terminal 13, the server 12 and the printing apparatus 11 in the printing/copying operations.

In the case of printing, a user conducts a predetermined printing operation at the client terminal 13 using application programs. If a printer driver 36 is selected from the application programs and printing is instructed by this printing operation (Step S101), the printer driver 36 produces print data of this job from the data sent from the application programs and creates information including user ID and the number of printing-scheduled sheets (data of the number of sheets to be used) (Step S102/P1).

The printer driver 36 transmits a permission request (printing permission request) for the job together with the information of the number of sheets to the server 12 before transmitting the print data (Step S103/P2).

When the server 12 receives the permission request for the job and the information of the number of sheets from the client terminal 13 (Step S111), the control system 31 discriminates the user ID included in the information of the number of sheets and obtains the administrating information of the number of sheets (the upper limit of the number of sheets and the number of printed and outputted sheets) corresponding to the user ID from the administrating database 32 for administrating the number of sheets (Step S112/P3). Furthermore, the control system 31 obtains the information of the number of sheets (the number of printing-scheduled sheets) of a printing waiting job (standby job) registered into the job queue corresponding to this user ID from the job queue memorizing section 33 (Step S113/P4). Here, the number of printing-scheduled sheets shown by the information of the number of sheets in the standby job indicates the number of reserved sheets under the condition of waiting for being printed and outputted.

The control system 31 conducts calculations based on the obtained information, and judges whether or not the number of sheets to be printed at this time by the execution of the job based on the permission request of a user ID exceeds the number of remaining sheets (the upper limit of the number of sheets) corresponding to the user ID. Accordingly, the control system 31 achieves the function of the judging section. Specifically, "the number of printing scheduled sheets" of the job requested permission at this time is compared with "the number of currently remaining sheets" obtained by subtracting "the number of printed and outputted sheets" and "the number of printing-reserved sheets" from "the upper limit of the number of sheets" in the data base, thereby judging whether or not the number of printing scheduled sheets exceeds the number of currently remaining sheets (Step S114).

> The number of currently remaining sheets=the upper limit of the number of sheets−(the number of printed and outputted sheets+the number of printing reserved sheets)

Here, since the number of remaining sheets is the number of sheets obtained by subtracting the number of printed and outputted sheets from the upper limit of the number of sheets (the number of remaining sheets=the upper limit of the number of sheets−the number of printed and outputted sheets), if this relationship is applied to the above formula, the number of currently remaining sheets is represented by the following formula.

> (the number of currently remaining sheets)=(the number of remaining sheets)−(the number of printing-reserved sheets)

(the number of currently remaining sheets)≧(the number of printing scheduled sheets)→This means that the number of printing scheduled sheets is within the number of remaining sheets (within the upper limit of the number of sheets).

(the number of currently remaining sheets)<(the number of printing scheduled sheets)→This means that the number of printing scheduled sheets exceeds the number of remaining sheets (exceeding the upper limit of the number of sheets).

As result of the comparison, the following reply is transmitted to the client terminal 13 (P5), in the case that printing can be conducted without exceeding the number of remaining sheets (Step S114; Yes), the permission of the job (registration permission) is transmitted (step S115), on the other hand, in the case of exceeding the number of remaining sheets if printing is conducted (Step S114; No), the prohibition of the job (registration prohibition) is transmitted (Step S116).

When the printer driver 36 of the client terminal 13 receives the permission of the job from the server 12 (Step S104; Yes), the printer driver 36 newly transmits the job information (printing reservation registering request) including the information of the number of sheets to the server 12 (Step S105/P6), and transmits print data directly to the printing apparatus 11 (Step S106/P6').

On the other hand, when the printer driver 36 receives the prohibition of the job (Step S104; No), the printer driver 36 notifies the user the situation (the printing prohibition) in such a way that, for example, the display section 37 indicates the situation that the instructed printing cannot be conducted due to the limitation of the number of sheets (Step S107), and the present processing is ended.

When the server 12 receives the job information from the client terminal 13, the control system 31 registers the job information based on the user ID included in the job information into the job queue in the job queue memorizing section 33 corresponding to the user ID at this time (steps S117/P7), and administrates the job queue. Further, in this job registration (spool), the information of the number of sheets is also stored collectively.

By this way, even when there is a standby job at the time of the permission request of a job (at the time of requesting the permission of printing), it is possible to grasp the number of remaining sheets at the present time (the number of currently remaining sheets) by taking the number of printing-reserved sheets obtainable from the information of the number of sheets of the standby job into account in addition to the administrating information of the number of sheets (the upper limit of the number of sheets/the number of printed and outputted sheets) administrated by the administrating data base of the number of sheets. Therefore, the number of remaining sheets including the standby job at the present time can be immediately notified to a permission request of a job.

When the printing apparatus 11 receives print data from the client terminal 13, the printing section 27 performs printing of the data (Step S121). After the printing is ended, the system control section 21 transmits a notice of the job termination to the server 12 (Step S122/P8), and the present processing is ended.

When the server 12 receives the notice of the job termination from the printing apparatus 11, the control system 31 deletes the job information (including the information of the number of sheets) from the job queue memorizing section 33 (step S118/P9). Further, the control system 31 renews the information of the number of printed and outputted sheet of the administrating information of the number of sheets corresponding to the user ID of the job executed at this time among the administrating information of the number of sheets memorized in the administrating data base 32 of the number of sheets (Step S119), and the present processing is ended.

The above mentioned processes are the processes of the printing operations, and the similar processes are conducted in the case of copying operations.

In the case of copying, a user conducts scanning for document sheets by a scanner section 26 of the printing apparatus 11. The image data of the document sheets read by this scanning action are once stored in DRAM 25. After the reading of image data of document sheets by the scanning is ended, the system control section 21 create the data of the number of sheets used for copying which becomes the information including the number of printing-scheduled sheets and a user ID (P11).

The system control section 21 transmits a permission request (printing permission request) for the copying job together with the information of the number of sheets to the server 12 before executing copying and outputting (P12).

When the server 12 receives the permission request for the copying job and the information of the number of sheets from the printing apparatus 11, the server 12 judges by the similar processing in the printing whether or not the number of sheets to be used by the execution of the copying job of the user ID requesting permission at this time exceeds the number of remaining sheets (the upper limit of the number of sheets) corresponding to the user ID, and conduct a response to the permission request by transmitting permission/prohibition of the copying job as a result of the judgment to the printing apparatus 11 (P15).

When the system control section 21 of the printing apparatus 11 receives permission (registration permission) of the job from the server 12, the system control section 21 newly transmits copying job information (printing reservation registering request) to the server 12 (P16), reads out image data (printing data) from DRAM 25, applies various image processing and transmits the image data to the printer section 27 (P16').

On the other hand, when the system control section 21 receives prohibition of the job (registration prohibition), the system control section 21 notifies the situation (prohibition of copying) to the user in such a way that a LCD display section 28 indicates the situation that the copying output of the document sheets scanned at this time cannot be executed due to the limitation of the number of sheets.

When the server 12 receives copying job information from the printing apparatus 11, the control system 31 registers the copying job information together with the information of the number of sheets into the job queue memorizing section 33 (P7), and administrates the job queue.

In the printing apparatus 11, when the printer section 27 executes printing of the image data and ends the printing, the system control section 21 transmits a notice of copying job termination to the server 12 (P18).

When the server 12 receives the notice of copying job termination from the printing apparatus 11, the control system 31 deletes the copying job information (including the information of the number of sheets) from the job queue memorizing section 33 (P9). Further, the control system 31 renews the number of printed and outputted sheets of the administrating information of the number of sheets corresponding to the user ID of the copying job executed at this time for the administrating database 32 of the number of sheets (P10).

Hereafter, examples in which job is permitted or prohibited will be explained.

EXAMPLE-1

The Case of Permission

User ID: User 1
Upper limit of the number of sheets: 1000 sheets
Count of already printed sheets: 950 sheets
(the number of printed and outputted sheets)
Printing waiting job A: 20 sheets
(the number of printing reserved sheets)
Printing waiting job B: 10 sheets
(the number of printing reserved sheets)
Newly generated jobs C: 10 sheets
(the number of printing scheduled sheets)

The upper limit (1000) of the number of sheets of User ID=User 1 and the count (950) of already printed sheets are stored in the administrating data base 32 of the number of sheets in the server 12. The information of the number (20) of sheets of the printing waiting job A and the number (10) of sheets of the printing waiting job B are stored in the job queue memorizing section 33.

When a permission request is transmitted to the server 12 at the time of having generated newly the job C, the server 12 obtains the count of printed sheets and the number of printing reserved sheets of each of the job A and the job B waiting for printing and calculates the number of remaining sheets at present (the number of currently remaining sheets) by subtracting these numbers from the upper limit of the number of sheets.

(the number of currently remaining sheets)

$$1000-(950+20+10)=20$$

The server 12 compares the calculated number of currently remaining sheets with the number of printing scheduled sheets of the new job C.

(the number of currently remaining sheets (20))>(the job C (10))→within the number of remaining sheets In this example, the server 12 judges that since the number of sheets of the job does not exceed the number of remaining sheets, it is possible to conduct printing, and the server 12 notifies permission of the job to the client terminal 13 (in the case of copying, to the printing apparatus 11).

EXAMPLE -2

The Case of Prohibition

User ID: User 2
Upper limit of the number of sheets: 1000 sheets
Count of already printed sheets: 950 sheets
(the number of printed and outputted sheets)
Printing waiting job D: 40 sheets
(the number of printing reserved sheets)
Newly generated jobs E: 20 sheets
(the number of printing scheduled sheets)

The upper limit (1000) of the number of sheets of User ID=User 2 and the count (950) of already printed sheets are stored in the administrating data base 32 of the number of sheets in the server 12. The information of the number (40) of sheets of the printing waiting job D is stored in the job queue memorizing section 33.

When a permission request is transmitted to the server 12 at the time of having generated newly the job E, the server 12 obtains the count of printed sheets and the number of printing reserved sheets of the job D waiting for printing and calculates the number of remaining sheets at present (the number of currently remaining sheets) by subtracting these numbers from the upper limit of the number of sheets.

(the number of currently remaining sheets)

$$1000-(950+40)=10$$

The server 12 compares the calculated number of currently remaining sheets with the number of printing scheduled sheets of the new job E.

(the number of currently remaining sheets (10))<(the job E (20))→Exceeding the number of remaining sheets In this example, the server 12 judges that since the number of sheets by printing exceeds the limitation, it is impossible to conduct printing, and the server 12 notifies prohibition of the registration to the client terminal 13 (in the case of copying, to the printing apparatus 11).

Further, the information of the number of sheets explained in the present embodiment may be produced as attribute information including the following information usable for accounting in printing and copying and the limitation of use (upper limit administration). Herein, optional items may be used selectively among the information exemplified below in accordance with functions (adaptable or non-adaptable to double-side printing or color printing) of the printing apparatus 11.

Administration IDs (department number, the name of a user, and the like)

Functional mode (copying/scanning/printing/FAX)

The number of printing document pages

The number of printing surfaces for each color mode

The number of printing sheets for each color mode

The number of printing surfaces for each sheet size

The number of printing sheets for each sheet size

The number of total printing surfaces

The number of total printing sheets

With regard to the administration of the use in printing or copying, the administration based on the number of printed sheets or the administration based on printing fee may suitably selected in accordance with administrating modes (policies). For example, in the case of the number of printed sheets, the administration is conducted by using directly the number of sheets (the value of the number of sheets) indicated by the information of the number of sheets, and in the case of printing fee, the administration can be conducted by converting the number of sheets indicated by the information of the number of sheets into an amount of money (value of money). Thus, the information of the number of sheets can be used as information directly showing the number of sheets, or information indirectly showing the amount of money in accordance with administration modes.

Furthermore, administration items may be selected appropriately as follows, the number of sheets and the amount of money may be administrated separately in accordance with administrating modes, for example, for each color mode (monochrome mode/color mode) or for each sheet size (A4 size/A3 size), or the number of sheets and the amount of money may be administrated collectively based on the total number of sheets and the total amount of money without considering color modes and sheet sizes.

Hereafter, the amount of money set in accordance with color modes and sheet sizes are exemplified.

A4 size monochrome mode: 10 yen/sheet

A4 size color mode: 40 yen/sheet

A3 size monochrome mode: 20 yen/sheet

A3 size color mode: 80 yen/sheet

In the administration based on printing fee, for example, the upper limit of the amount of money during the predetermined period (one week base or one month base) is determined and the remaining amount of money is obtained by the calculation of subtracting the converted amount of money (the used amount of money) based on the number of already printed and outputted sheets from the upper limit of the amount of money.

If the remaining amount of money is converted into the number of remaining sheets by the calculation of dividing the remaining amount of money with an amount of money (a converting amount of money) corresponding to the color mode and the sheet size of the job requesting permission of printing, the administration can conducted by the use of the calculated number of remaining sheets.

(the remaining amount of money)=(the upper limit of the amount of money)−(the used amount of money)

(the number of remaining sheets)=(the remaining amount of money)/(the converting money)

Conventionally, the information with regard to the above number and amount is obtained from the job log and the counter value after printing is executed. However, in the present embodiment, the information of the above number of sheets (attribute information) is produced in advance before printing is executed. By the utilization of this information of the number of sheets, it can be possible to grasp the number of sheets (the number of printing scheduled sheets) used for printing and outputting the present job.

As explained above, in the printing system 10 according to the present embodiment, the information of the number of sheets (administrating data of the number of sheets) is added into printing/copying job for each ID and the administrating for the number of sheets including the number of sheets (the number of reserved sheets) of the standby job administrated by the job queue can be realized. Conventionally, when there is a standby job, the limitation of the number of sheets (the exceeding from the number of remaining sheets) cannot be judged accurately until the standby job is executed. However, with the above administration, the limitation of the number of sheet can be judged at the time of requesting permission for a new job, the possibility to permit printing in excess of the limitation of the number of sheets becomes small. Especially, in the case that plural users use the same ID at the time of conducting a department administration, and in the case that a great number of jobs are generated in the production market, it is estimated that jobs waiting for outputting are generated frequently. Therefore, the administrating of the number of sheet explained in the present embodiment is effective in the above cases.

Further, in the administrating of job queue, the job queue is administrated for each user ID based on the user ID included in job information. Therefore, in comparison with the case that job queue is not administrated for each user ID, it is possible to grasp promptly the number of sheets of a standby job (the number of reserved sheets) corresponding to the user ID requesting permission for printing and the administration can be conducted efficiently.

Further, since the job information for which printing and outputting are ended can be deleted from the job queue memorizing section 33, the number of reserved sheets by a standby job can be administrated with a correct value. Furthermore, in the administrating data base 32 of the number of sheets, by renewing the administrating information of the number of sheets (the number of printed and outputted sheets) corresponding to the user ID for which printing and outputting are ended, the administrating information of the number of sheets can be administrated with the correct value.

Further, when the permission request of a job is prohibited, the user is adapted to receive a notice of printing prohibition. Therefore, the user can recognize that the printing instructed by the user becomes printing prohibition.

As mentioned above, although the embodiment of the present invention has been explained with reference to the drawings, the concrete structure is not restricted to the structures shown in the embodiments, and even if there are the modification and the addition which do not deviate from the range of the gist of the present invention, those are included in the present invention.

For example, in the embodiment, in order to perform printing (print/copy) per job, the administration of the number of remaining sheets or the number of reserved sheets (the number of sheets of a standby job) in printing is performed per job. However, the administration of the number of remaining sheets or the number of reserved sheets may be performed per the number of sheets.

Further, after a response of printing permission is received to a request of printing permission (request of job permission), the information of the number of printing scheduled sheets is newly transmitted together with printing reservation registering request (job information) and registered in the job queue. However, the registering of the information of the number of sheets into the job queue may be conducted by the request of printing permission. Also, the printer having received the printing request (printing data) transmits the number of printing scheduled sheets to the server and the server administrates (registers it into job queue) the number of printing scheduled sheets by the number of printing scheduled sheets received from the printer.

Further, in the administration of the job queue by the job queue memorizing section 33, job queues corresponding to each functional mode of printing/copying are prepared, and the job queues are administrated for each functional mode. Furthermore, in the embodiment, plural job queues corresponding to plural user ID are prepared and the job queue is administrated for each user ID. However, for example, the job queue may be administrated in such a way that jobs of different user IDs are registered in one job queue. In this case, by referring to the user ID included in the job information registered into the job queue, the standby job of the same user ID as the user ID having transmitted the printing permission request can be found out, and the information of the number of sheets can be obtained.

Further, in the printing system structured such that a server administrates print data and distributes the print data to a printer, a printing request (transmission of print data) may be conducted for the server.

Further, when printing prohibition due to the limitation of the number of sheets is notified to a user, information of the number of remaining sheets at the present time and the number of reserved sheets may be notified together with the above notification.

Further, in the above embodiment, targets to be administrated with regard to the use of printing are made users (individual) and departments (organization). However, the targets to be administrated may be selected appropriately in accordance with an administrating embodiment. For example, a group consisting of several users sharing a client terminal may be made as a target to be administrated.

Moreover, as the identification information (ID) to identify a user (an operator/a target person to be administrate), ID of a login authentication (password authentication, IC (Integrated Circuit) card authentication, biometric authentication, etc.) to a client terminal may be available in printing from the client terminal. In copying by a printer, ID of user authentication (password authentication, IC card authorization, etc.) at the time of conducting copying may be available.

Moreover, the using administration may not be conducted for each of identification information, instead, may be conducted for each printer or for each client terminal.

Moreover, in the above embodiment, the case that the printing apparatus 11 and the server 12 are constituted individually is exemplified. However, the function of the server 12 may be provided to the printing apparatus 11. That is, a printer is provided with a printing function section (11) and a server function section (12) as shown in FIG. 2. However, in a printing system in which plural printers are used by being connected to a network, an administration with the same ID for the plural printers becomes possible by making a server function section independent from a printer. Therefore, it is desirable to provide an exclusive server as explained in the embodiment.

Moreover, the present invention is applicable not only to the printing system equipped with the printer constituted by a composite machine as explained in the above embodiment, but also to a printing system equipped with other printers, such as a printer and a copying machine.

What is claimed is:

1. A printing system, comprising:
a printing request section;
a printing section; and
an administrating section, wherein the printing request section, the printing section and the administrating section are connected with each other so as to be able to communicate,
wherein the printing request section is configured to transmit a printing permission request to the administrating section, wherein the printing permission request includes a number of sheets of a first print job and does not include print data of the first print job, and wherein the printing request section is configured to transmit a printing request to the printing section when the administrating section indicates a printing permission for the printing permission request, and
wherein the administrating section comprises:
a first administrating section configured to calculate a number of printable remaining sheets until the number of sheets printed by the printing section reaches a predetermined upper limit of a number of printable sheets,
a second administrating section configured to receive a number of reserved sheets of a second print job, the second print job provided with a printing permission and being under a waiting condition for being printed and outputted in the printing section, and
a judging section configured to compare the number of reserved sheets and the number of sheets of the first print job included in the printing permission request with the number of printable remaining sheets calculated by the first administrating section, wherein the judging section is configured to determine whether the first print job requested by the printing permission request is to be permitted, and wherein the judging section is configured to transmit the determination as a response to the printing permission request.

2. The printing system according to claim 1, wherein when the administrating section indicates a printing permission, the printing request section transmits a printing reservation registering request including information of the number of requested sheets of the printing permission to the administrating section,
the printing section transmits information of a number of printed sheets printed and outputted based on the printing request to the administrating section,
the second administrating subsection of the administrating section adds the number of sheets indicated by the printing reservation registering request to the number of reserved sheets and subtracts the number of printed sheets from the number of reserved sheets so that the second administrating subsection renews the number of reserved sheets, and
the first administrating section is configured to calculate the number of printable remaining sheeted by subtracting the number of printed sheets from the number of printable remaining sheets so that the first administrating section renews the number of remaining sheets.

3. The printing system according to claim 1, wherein when the response from the administrating section indicates a printing prohibition, the printing request section notifies a printing system user who instructed the second print job of the printing prohibition.

4. The printing system according to claim 1, wherein the printing requesting section is configured to add identification information to identify a user having instructed the first print job to the information of the number of sheets of the first print job, and the printing requesting section is configured to administer the number of printable remaining sheets for each user based on the identification information.

5. A printing apparatus, comprising:
a printing section configured to print based on a printing request received from a printing requesting apparatus, wherein the printing requesting apparatus is configured to transmit a printing permission request which includes information of a number of sheets of a first print job and does not include print data of the first print job, and wherein, the printing requesting apparatus is configured to transmit a printing request to the printing section after a printing permission for the printing permission request has been indicated, a first administrating section configured to calculate a number of printable remaining sheets until the number of sheets printed by the printing section reaches a predetermined upper limit of a number of printable sheets, a second administrating section configured to receive a number of reserved sheets of a second print job, the second print job provided with a printing permission and being under a waiting condition for being printed and outputted in the printing section, and a judging section configured to compare the number of reserved sheets and the number of sheets of the first print job included in the printing permission request with the number of printable remaining sheets calculated by the first administrating section, wherein the judging section is configured to determine whether the first print job requested by the printing permission request is to be permitted, and wherein the judging section is configured to transmit the determination as a response to the printing permission request.

6. The printing apparatus according to claim 5, wherein the second administrating subsection of the administrating section adds the number of sheets indicated by the printing reservation registering request to the number of reserved sheets and subtracts the number of printed sheets from the number of reserved sheets so that the second administrating subsection renews the number of reserved sheets, and the first administrating section is configured to calculate the number of printable remaining sheeted by subtracting the number of printed sheets from the number of printable remaining sheets so that the first administrating section renews the number of remaining sheets.

7. The printing apparatus according to claim 5, wherein the printing requesting section is configured to add identification information to identify a user having instructed the first print job to the information of the number of sheets of the first print job, and the printing requesting section is configured to administer the number of printable remaining sheets for each user based on the identification information.

8. An administrating apparatus, wherein the administrating apparatus is configured to communicate with a printing requesting apparatus and a printing apparatus, the printing requesting apparatus configured to transmit a printing permission request, wherein the printing permission request includes a number of sheets of a first print job and does not include print data of the first print job, and wherein the printing requesting apparatus is configured to transmit a printing request to the printing apparatus after a printing permission for the first printing permission request has been indicated, the administrating apparatus comprising:

a first administrating section configured to calculate a number of printable remaining sheets until the number of sheets printed by the printing section reaches a predetermined upper limit of a number of printable sheets, a second administrating section configured to receive a number of reserved sheets of a second print job, the second print job provided with a printing permission and being under a waiting condition for being printed and outputted in the printing section, and a judging section configured to compare the number of reserved sheets and the number of sheets of the first print job included in the printing permission request with the number of printable remaining sheets calculated by the first administrating section, wherein the judging section is configured to determine whether the first print job requested by the printing permission request is to be permitted, and wherein the judging section is configured to transmit the determination as a response to the printing permission request.

9. An administrating apparatus for the number of sheets to be printed, wherein the administrating apparatus is connected to be able to communicate with a printing requesting apparatus to transmit a printing permission request including information of the number of sheets being scheduled to be printed to the administrating apparatus and transmits a printing request for the scheduled printing to a printing apparatus in the case of receiving a printing permission by a response from the administrating apparatus and a printing apparatus to print based on the printing request received from the printing requesting apparatus, the administrating apparatus comprising:

a first administrating section for administrating the number of remaining sheets until the number of sheets printed by the printing section reaches to a predetermined upper limit of the number of sheets, a second administrating section for administrating the number of reserved sheets being under a waiting condition for being printed and outputted in the printing section, and a judging section for comparing the total number of sheets of the number of reserved sheets administrated by the second administrating section and the number of scheduled sheets indicated by the information of the number of sheets included in the printing permission request with the number of remaining sheets administrated by the first administrating section when receiving the printing permission request, for judging from the comparison whether or not the printing requested by the printing permission request is to be permitted, and for transmitting the judgment result as the response to the printing permission request, wherein, when the second administrating section receives a printing reservation registering request including information of the number of printing-scheduled sheets of a printing permission from the printing requesting apparatus having received a response of the printing permission from the administrating apparatus, the second administrating section adds the number of scheduled sheets indicated by the information of the number of sheets included in the printing reservation registering request to the number of reserved sheets, and when the second administrating section receives the information of the number of printed sheets printed and outputted based on the printing request from the printing apparatus, the second administrating section subtracts the number of printed sheets indicated by the information of the number of printed sheets from the number of reserved sheets, whereby the second administrating subsection renews the number of reserved sheets, and when the first administrating section receives the information of the number of printed sheets printed and outputted based on the printing request from the printing apparatus, the first administrating section subtracts the number of printed sheets indicated by the information of the number of printed sheets from the number of remaining sheets so that the first administrating section renews the number of remaining sheets.

10. The administrating apparatus according to claim 8, wherein the printing requesting section is configured to add identification information to identify a user having instructed the first print job to the information of the number of sheets of the first print job, and the printing requesting section is configured to administer the number of printable remaining sheets for each user based on the identification information.

11. A non-transitory computer-readable medium storing a program for administrating a number of sheets of a first print job to be printed, the program comprising:

a first function configured to administrate a number of printable remaining sheets until the number of sheets printed by a printing section reaches a predetermined upper limit of a number of printable sheets, and wherein the first function is configured to administrate a number of reserved sheets being under a waiting condition for being printed and outputted in the printing section, the first function being configured to compare the number of reserved sheets and the number of sheets of the first print job with the number of printable remaining sheets when a printing permission request is received, wherein the printing permission request includes the number of sheets of the first print job and does not include print data of the first print job, and wherein the first function is configured to judge from the comparison whether the printing requested by the printing permission request is to be permitted, and to transmit the judgment result as a response to the printing permission request;

a second function configured to transmit a printing reservation registering request including the number of sheets of the first print job to the first function after receiving a response of printing permission from the first function, and wherein the second function is configured to make the first function to renew the number of reserved sheets being under a waiting condition for being printed and outputted; and a third function configured to transmit a printing request for the first print job to the printing section, the printing request including the print data of the first print job.

12. The non transitory computer-readable medium according to claim 11, further comprising a function configured to notify a user of a printing prohibition, the user having instructed the first print job, when the response from the first function indicates the printing prohibition.

13. The non transitory computer-readable medium according to claim 11, further comprising a function configured to add identification information to identify a user having instructed the first print job to the information of the number of sheets of the first print job.

* * * * *